US009454801B2

(12) United States Patent
Kuroki

(10) Patent No.: US 9,454,801 B2
(45) Date of Patent: Sep. 27, 2016

(54) IMAGE PROCESSING APPARATUS, METHOD FOR PROCESSING IMAGE, AND PROGRAM

(71) Applicant: CANON KABUSHIKI KAISHA, Tokyo (JP)

(72) Inventor: Daisuke Kuroki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/601,696

(22) Filed: Jan. 21, 2015

(65) Prior Publication Data

US 2015/0206293 A1 Jul. 23, 2015

(30) Foreign Application Priority Data

Jan. 22, 2014 (JP) .................................. 2014-009778

(51) Int. Cl.
*G06T 3/40* (2006.01)
*H04N 5/232* (2006.01)

(52) U.S. Cl.
CPC ......... *G06T 3/4069* (2013.01); *H04N 5/23229* (2013.01)

(58) Field of Classification Search
None
See application file for complete search history.

(56) References Cited

U.S. PATENT DOCUMENTS

2009/0324135 A1* 12/2009 Kondo .................. G06T 3/4038
382/284

FOREIGN PATENT DOCUMENTS

JP 6-149993 A 5/1994
JP 2005-135096 A 5/2005

* cited by examiner

*Primary Examiner* — Siamak Harandi
*Assistant Examiner* — Amandeep Saini
(74) *Attorney, Agent, or Firm* — Canon USA, Inc., IP Division

(57) ABSTRACT

An image processing apparatus that outputs a transformed image obtained by performing geometric transformation on an input image identifies, on the basis of inverse parameters of the geometric transformation, a plurality of sets of coordinates in the input image corresponding to a plurality of sets of coordinates in the transformed image, store, among the plurality of sets of coordinates in the transformed image, one or more sets of coordinates that satisfy a certain condition and the identified sets of coordinates corresponding to the one or more sets of coordinates in a memory while associating the one or more sets of coordinates and the identified sets of coordinates with each other, and generates the transformed image on the basis of data stored in the memory.

11 Claims, 3 Drawing Sheets

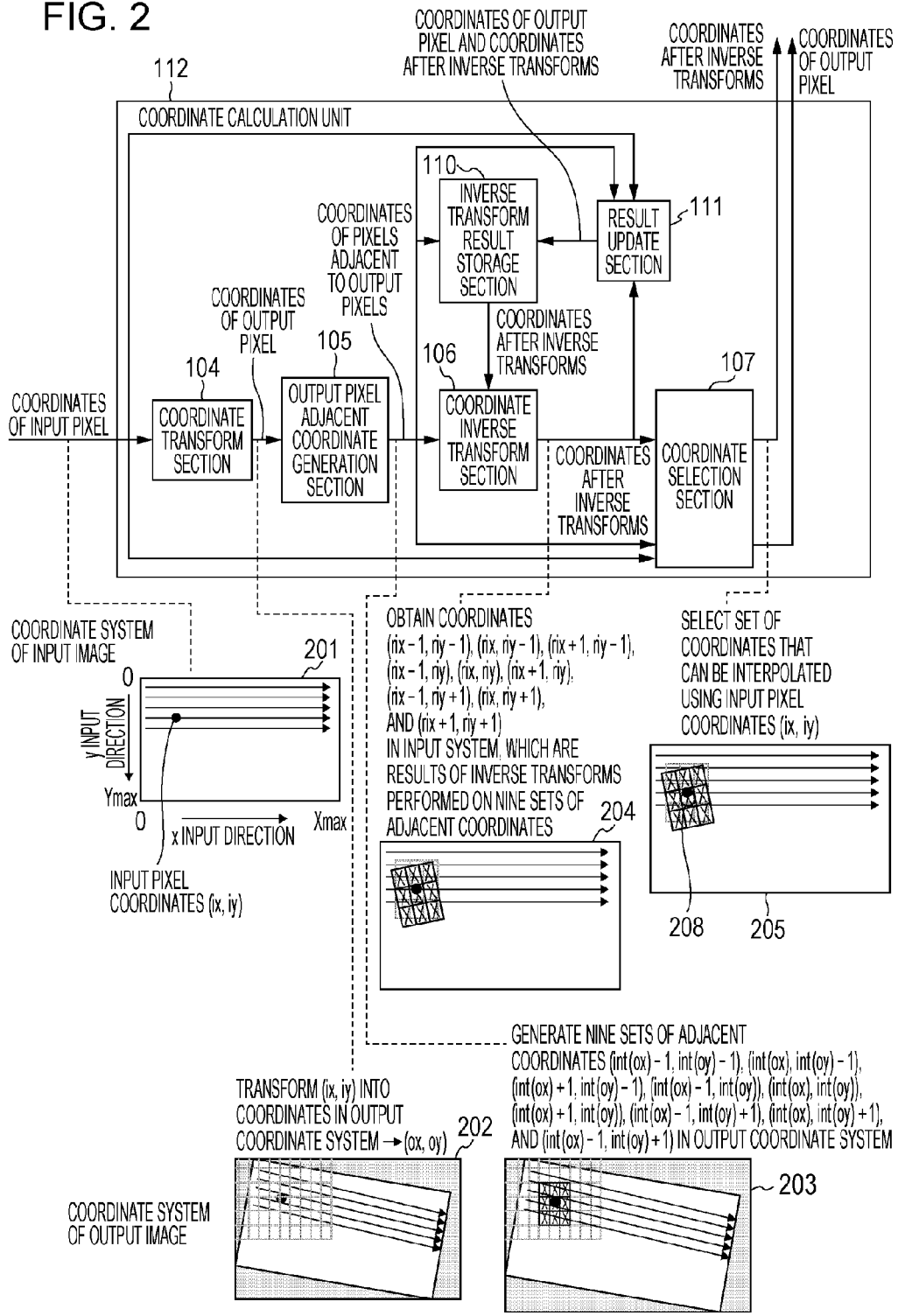

IMAGE PROCESSING APPARATUS, METHOD FOR PROCESSING IMAGE, AND PROGRAM

BACKGROUND OF THE INVENTION

1. Field of the Invention

The present invention particularly relates to an image processing apparatus, a method for processing an image, and a program that are desirably used in coordinate transforms performed on images.

2. Description of the Related Art

Currently, an image processing apparatus that performs geometric transformation, such as keystone correction or lens correction, on an image captured by a camera or the like is known. In such an image processing apparatus that performs geometric transformation, first, input pixels corresponding to one screen are stored in a memory. Next, by performing inverse transforms of coordinate transforms used in the geometric transformation, the coordinate values of the input pixels are calculated from the coordinate values of output pixels in order of scanning of the output pixels. Furthermore, a process is repeated in which pixels adjacent to the input pixels are read from the memory using integer parts of the coordinates of each input pixel obtained as a result of the inverse transform, interpolation is performed using fractional parts of the coordinates of the adjacent pixels and each input pixel, and the value of the corresponding output pixel is determined. This process is called a "coordinate transform during reading", and image processing for the geometric transformation is realized through this process. For example, in Japanese Patent Laid-Open No. 2005-135096, a method for processing an image is disclosed in which an output image is divided into tiles and coordinate transforms during reading are performed for each tile.

If keystone correction for a front projector or lens correction for a camera is performed, an enlargement ratio when an input image is transformed into an output image is about 0.6 at minimum and about 1.25 at maximum. Furthermore, images need to be input and output in real-time in some cases. If the above-described method for processing an image is used while inputting and outputting images with 1 [pixel/cyc], the sum of the peak values of a necessary memory band during writing and reading undesirably becomes (1+1/minimum value of enlargement ratio) [pixels/cyc]. For example, if the minimum value of the enlargement ratio is 0.6, a memory band of 2.67 [pixels/cyc] is necessary at the peak. Thus, a large memory band is necessary in some cases, which is problematic.

On the other hand, a type of geometric transformation called a "coordinate transform during writing" is known. In this method, first, the coordinates of output pixels are calculated for input pixels, which are input in order of scanning, through coordinate transforms. Next, storage addresses in a memory are calculated from integer parts of the coordinates of the output pixels. Furthermore, inverse transforms of the coordinate transforms are performed on the integer parts of the coordinates of the output pixels to obtain coordinates in an input image. If integer parts of each set of coordinates obtained as a result of the inverse transform match those of the original set of coordinates of the corresponding input pixel, a pixel value to be output is obtained by performing interpolation using pixels adjacent to the input pixel and fractional parts of the coordinates obtained as a result of the inverse transform of the coordinate transform. The pixel value is stored in the storage address obtained before.

If the coordinate transform during writing is performed, the sum of the peak values of a memory band used during writing and reading is (1+maximum value of enlargement ratio) [pixels/cyc]. For example, even if the maximum value of the enlargement ratio is 1.25, the necessary memory band can be suppressed to 2.25 [pixels/cyc]. Thus, within the assumed enlargement ratio range, the peak value of the memory band can be smaller than in the coordinate transform during reading.

On the other hand, if the coordinate transform during writing is performed, pixels that are not output might be generated. Therefore, for example, in Japanese Patent Laid-Open No. 6-149993, a method in which generation of pixels that are not output is suppressed by scanning the coordinates of input pixels in units of sub-pixels is disclosed.

In the method disclosed in Japanese Patent Laid-Open No. 6-149993, a total of eight transform calculations, namely calculations of coordinate transforms for four sets of coordinates and calculations of inverse transforms for four sets of coordinates, are necessary even if sub-pixel scanning is performed after dividing a pixel in half in an x-axis direction and a y-axis direction. Especially in a projective transform, which is one of types of geometric transformation, the calculation amount is substantially the same between the coordinate transform and the inverse transform, and both the coordinate transform and the inverse transform include divisions. Accordingly, the amount of processing in each transform calculation is large. Therefore, in the method disclosed in Japanese Patent Laid-Open No. 6-149993, the size of circuits is large and the amount of processing in each calculation is large, which are problematic.

SUMMARY OF THE INVENTION

The present invention provides an image processing apparatus that outputs a transformed image obtained by performing geometric transformation on an input image. The image processing apparatus includes an identification unit configured to identify, on the basis of inverse parameters of the geometric transformation, a plurality of second sets of coordinates in the input image corresponding to a plurality of first sets of coordinates in the transformed image located within a certain distance from a first set of coordinates, a storage control unit configured to store, among the plurality of first sets of coordinates in the transformed image, sets of coordinates that overlap a plurality of third sets of coordinates in the transformed image located within the certain distance from a second set of coordinates and sets of coordinates identified by the identification unit as sets of coordinates in the input image corresponding to the overlapped sets of coordinates on the basis of the inverse parameters in a memory while associating the overlapped sets of coordinates and the sets of coordinates identified by the identification unit with each other, and a generation unit configured to generate the transformed image by determining pixel values corresponding to the plurality of sets of first coordinates in the transformed image using pixel values corresponding to the plurality of second sets of coordinates identified by the identification unit and pixel values corresponding to the plurality of second sets of coordinates in the transformed image using pixel values corresponding to the sets of coordinates in the input image stored by the storage control unit in the memory.

Further features of the present invention will become apparent from the following description of exemplary embodiments with reference to the attached drawings.

BRIEF DESCRIPTION OF THE DRAWINGS

FIG. 2 is a diagram illustrating a detailed operation of a coordinate calculation unit according to the embodiment.

DESCRIPTION OF THE EMBODIMENTS

An embodiment of the present invention will be described hereinafter with reference to the drawings.

Figure 1:
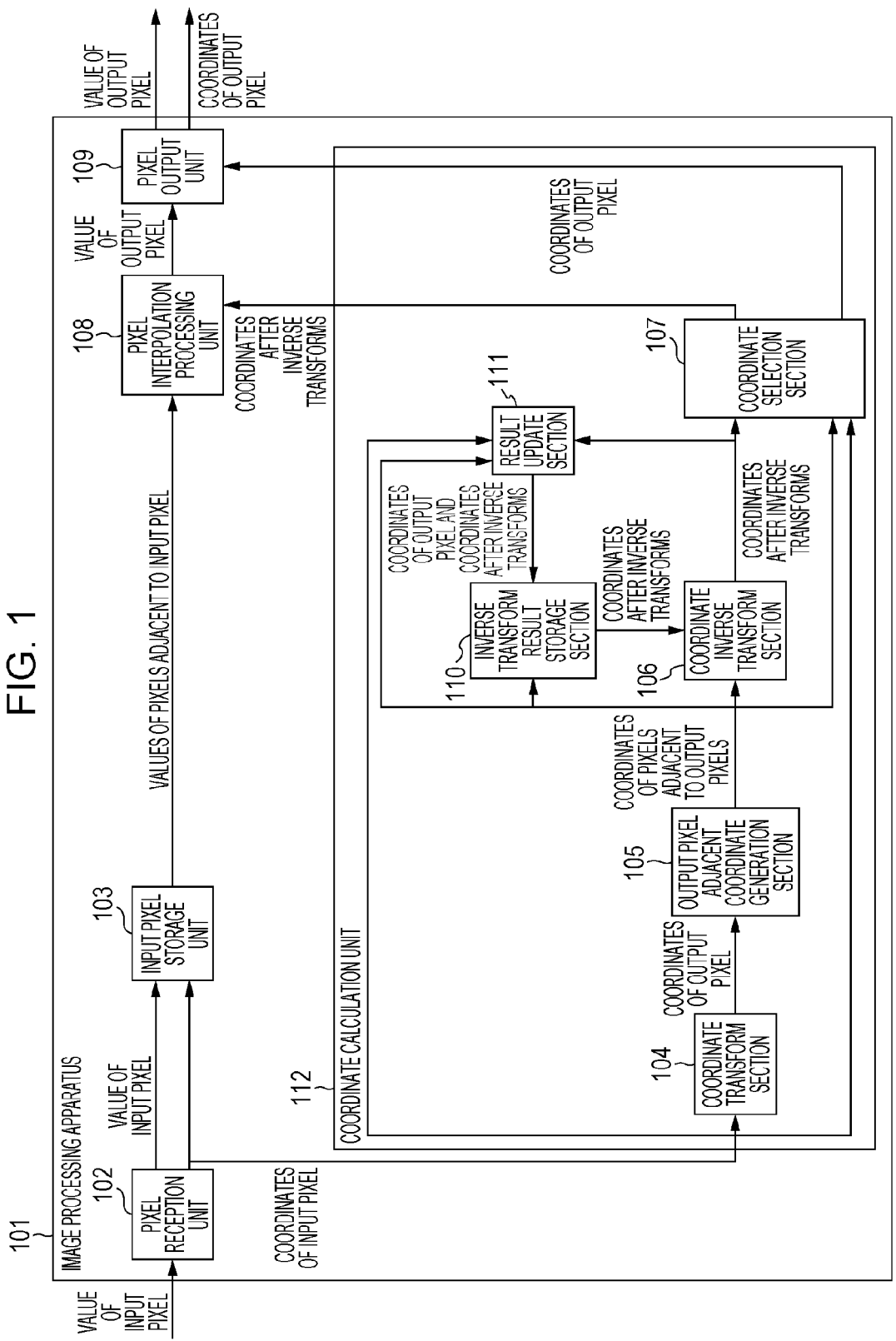
FIG. 1 is a block diagram illustrating an example of the overall configuration of an image processing apparatus according to an embodiment.

FIG. 1 is a block diagram illustrating an example of the overall configuration of an image processing apparatus 101 according to this embodiment.

The image processing apparatus 101 according to this embodiment is controlled in such a way as to receive the values of input pixels, which configure an input image, in order of scanning and, after geometric transformation, output the values of output pixels, which configure an output image, and the coordinates of the output pixels corresponding to the values of the output pixels. In the following description, progressive scanning is taken as an example of the order of scanning.

A pixel reception unit 102 receives the value of an input pixel as image information and obtains the x and y coordinates of the input pixel in a coordinate system of an input image. The coordinate system of an input image will be referred to as an input coordinate system hereinafter. Since input pixels are received in accordance with progress scanning, the pixel reception unit 102 increments the x coordinate by 1 each time the pixel reception unit 102 receives the value of an input pixel. After the x coordinate reaches one horizontal period, the pixel reception unit 102 resets the x coordinate to 0 and increments the y coordinate by 1. After the x coordinate reaches one horizontal period and the y coordinate reaches one vertical period, the pixel reception unit 102 resets the x and y coordinates to 0. The pixel reception unit 102 outputs the values of the input pixels and the generated coordinates of the input pixels to an input pixel storage unit 103 and the generated coordinates of the input pixels to a coordinate calculation unit 112.

The input pixel storage unit 103 stores the values of input pixels and the coordinates of the input pixels and outputs the values of pixels (the values of input adjacent pixels) necessary for pixel interpolation performed by a pixel interpolation processing unit 108 in accordance with a request from the pixel interpolation processing unit 108.

The pixel interpolation processing unit 108 receives the values of input adjacent pixels from the input pixel storage unit 103 and fractional parts of coordinates after an inverse transform from a coordinate selection section 107 of the coordinate calculation unit 112. The pixel interpolation processing unit 108 then outputs the value of an output pixel as a result of processing in the pixel interpolation. For example, if bilinear interpolation is performed, the pixel interpolation processing unit 108 performs the bilinear interpolation on the basis of the values of 2×2 pixels including the value of an input pixel, and outputs the value of an interpolated output pixel. If bicubic interpolation is performed, the pixel interpolation processing unit 108 performs the bicubic interpolation on the basis of the values of 4×4 pixels including the value of an input pixel, and outputs the value of an interpolated output pixel.

A pixel output unit 109 receives the values of output pixels from the pixel interpolation processing unit 108 and the coordinates of output pixels in a coordinate system of an output image from the coordinate selection section 107 of the coordinate calculation unit 112. The pixel output unit 109 then outputs the coordinates of output pixels corresponding to the values of the output pixels. In the following description, the coordinate system of an output image will be referred to as an output coordinate system.

The coordinate calculation unit 112 includes a coordinate transform section 104, an output pixel adjacent coordinate generation section 105, a coordinate inverse transform section 106, the coordinate selection section 107, an inverse transform result storage section 110, and a result update section 111. The coordinate calculation unit 112 receives the coordinates of input pixels and outputs coordinates obtained as a result of inverse transforms and the coordinates of output pixels.

FIG. 2 is a diagram illustrating a detailed operation performed by the coordinate calculation unit 112. A detailed process performed by the coordinate calculation unit 112 will be described hereinafter.

The coordinate transform section 104 receives coordinates (ix, iy) of an input pixel in an input coordinate system 201 from the pixel reception unit 102 and performs a projective transform. The coordinate transform section 104 then outputs coordinates (ox, oy) of an output pixel in an output coordinate system 202. It is to be noted that pixels are received in accordance with progressive scanning, and the size of an image is $X_{max} \times Y_{max}$.

The projective transform is expressed by a 3×3 matrix consisting of $m_{11}$ to $m_{33}$, and the coordinates (ox, oy) of the output pixel are obtained by performing calculations on the coordinates (ix, iy) of the input pixel using the following expression (1).

$$ox_0 = m_{11} \cdot ix + m_{12} \cdot iy + m_{13} \cdot oy_0 = m_{21} \cdot ix + m_{22} \cdot iy + m_{23} \cdot oz_0 = m_{31} \cdot ix + m_{32} \cdot iy + m_{33} \cdot ox = ox_0/oz_0 oy = oy_0/oz_0 \quad (1)$$

The output pixel adjacent coordinate generation section 105 receives the coordinates (ox, oy) of the output pixel from the coordinate transform section 104 and generates nine sets of adjacent coordinates having integer parts of the coordinates of the output pixel as the center. The output pixel adjacent coordinate generation section 105 then outputs the nine sets of coordinates as the coordinates of pixels adjacent to the output pixel in the output coordinate system 202. Here, the coordinates (ox, oy) of the output pixel include fractional parts. If an integer part of an x coordinate ox is denoted by int(ox) and an integer part of a y coordinate oy is denoted by int(oy), nine pixels adjacent to the output pixel in an output coordinate system 203 are indicated by X's in FIG. 2, and the coordinates thereof are as follows:

(int(ox)−1, int(oy)−1)
(int(ox), int(oy)−1)
(int(ox)+1, int(oy)−1)
(int(ox)−1, int(oy))
(int(ox), int(oy))
(int(ox)+1, int(oy))
(int(ox)−1, int(oy)+1)
(int(ox), int(oy)+1)
(int(ox)+1, int(oy)+1)

The coordinate inverse transform section 106 receives the nine sets of coordinates of the pixels adjacent to the output pixel in the output coordinates system 203 from the output pixel adjacent coordinate generation section 105. The coordinate inverse transform section 106 then outputs nine sets of coordinates in an input coordinate system 204 obtained by performing inverse transforms on the nine sets of coordinates.

The positions of the nine sets of coordinates in the input coordinates system 204 after the inverse transforms are indicated by X's in FIG. 2, and the coordinates of the nine sets of coordinates are as follows. It is to be noted that the inverse transform is the same calculation as the projective transform performed by the coordinate transform section 104.

(rix−1, riy−1)
(rix, riy−1)
(rix+1, riy−1)
(rix−1, riy)
(rix, riy)
(rix+1, riy)
(rix−1, riy+1)
(rix, riy+1)
(rix+1, riy+1)

The coordinate selection section 107 receives a set of coordinates of an input pixel in the input coordinate system 201 from the pixel reception unit 102 and nine sets of coordinates of pixels adjacent to an output pixel in the output coordinate system 203 from the output pixel adjacent coordinate generation section 105. Furthermore, the coordinate selection section 107 receives nine sets of coordinates in the input coordinate system 204 obtained as a result of inverse transforms. The coordinate selection section 107 then selects, from among the nine sets of coordinates in the input coordinate system 204 obtained as a result of the inverse transforms, a set of coordinates that can be interpolated using the set of coordinates in the input coordinate system 201 and outputs the set of coordinates to the pixel interpolation processing unit 108 as coordinates after the inverse transform. In addition, the coordinate selection section 107 outputs, among the nine sets of coordinates of the pixels adjacent to the output pixel in the output coordinate system 203, a set of coordinates corresponding to the selected set of coordinates in the input coordinate system 204 to the pixel output unit 109 as the coordinates of the output pixel.

In an input coordinate system 205, a solid circle indicates the coordinates (ix, iy) of the input pixel. Here, a set of coordinates that can be interpolated using the coordinates (ix, iy) of the input pixel is a set of coordinates 208 indicated by a hollow circle. Therefore, the coordinate selection section 107 outputs the coordinates (rix, riy) as the coordinates after the inverse transform and the coordinates (int (ox), int(oy)) as the coordinates of the output pixel.

The result update section 111 receives the set of coordinates of the input pixel in the input coordinate system 201 from the pixel reception unit 102 and the nine sets of coordinates of the pixels adjacent to the output pixel in the output coordinate system 203 from the output pixel adjacent coordinate generation section 105. Furthermore, the result update section 111 receives the nine sets of coordinates in the input coordinate system 204 obtained as a result of the inverse transforms from the coordinate inverse transform section 106. The result update section 111 then determines a set of coordinates in an output coordinate system to be subjected to an inverse transform performed by the coordinate inverse transform section 106 on the basis of the order of scanning of input pixels, the coordinates of the input pixel, and the coordinates obtained as a result of the inverse transform. As a result of the determination, the result update section 111 outputs, for the target coordinates, the coordinates of the output pixel and the coordinates obtained as a result of the inverse transform to the inverse transform result storage section 110 to hold these coordinates.

The inverse transform result storage section 110 holds coordinates in an output coordinate system and coordinates in an input coordinate system that are a result of inverse transforms performed on the coordinates in the output coordinate system. The inverse transform result storage section 110 receives the nine sets of coordinates of the pixels adjacent to the output pixel from the output pixel adjacent coordinate generation section 105 and determines whether there is a set of coordinates that matches any of the nine sets coordinates. If there is a set of coordinates that matches any of the nine sets of coordinates, the inverse transform result storage section 110 outputs a set of coordinates in the input coordinate system that are a result of an inverse transform to the coordinate inverse transform section 106. In this embodiment, the coordinate inverse transform section 106 needs to output the nine sets of coordinates obtained as a result of the inverse transforms, but if the inverse transform result storage section 110 holds the results of the inverse transforms, namely the sets of coordinates, the inverse transforms for the sets of coordinates may be omitted, and the results stored in the inverse transform result storage section 110 are used, instead.

FIGS. 3A to 3F are diagrams illustrating a process for determining coordinates to be held by the result update section 111 according to this embodiment.

Figure 3C:
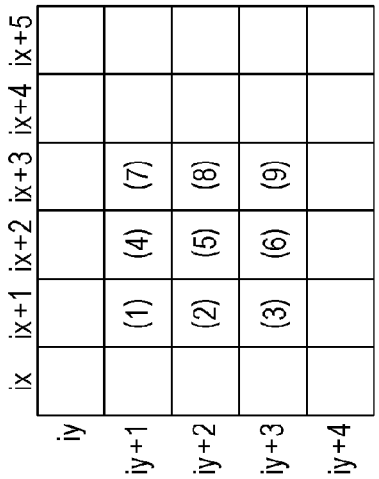
FIGS. 3A to 3F diagrams illustrating a process for determining coordinates to be held by a result update section according to the embodiment.
Figure 3F:
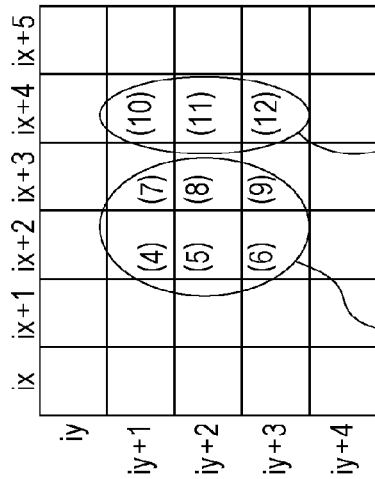
Figure 3B:
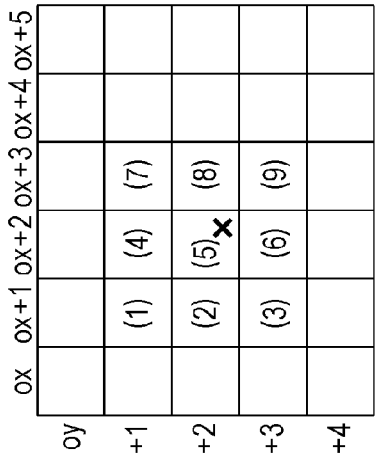
Figure 3E:
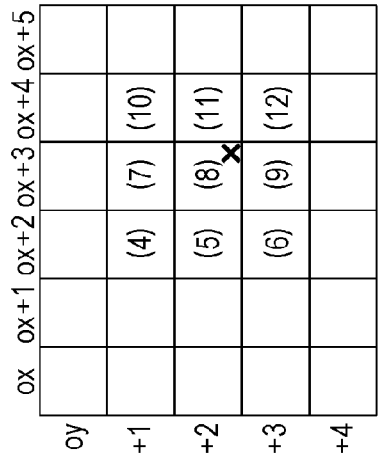
Figure 3A:
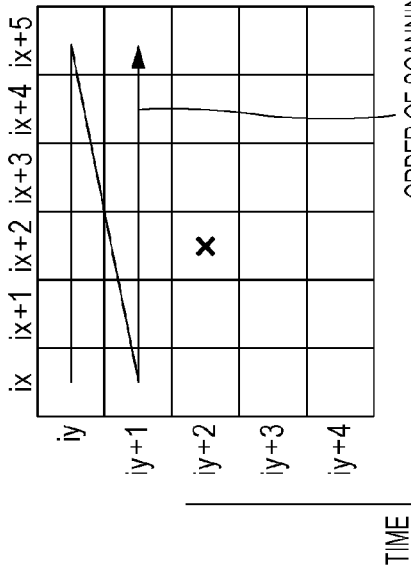

FIG. 3A illustrates an input coordinate system, and an X indicates coordinates (ix+2, iy+2) of an input pixel. FIG. 3B illustrates an output coordinate system, and an X indicates coordinates (ox+2, oy+2), which are a result of a transform performed by the coordinate transform section 104. Here, nine sets of coordinates adjacent to an output pixel generated by the output pixel adjacent coordinate generation section 105 are indicated by coordinates (1) to (9) illustrated in FIG. 3B. Results output by the coordinate inverse transform section 106 after the nine sets of coordinates are input to the coordinate inverse transform section 106 are indicated by coordinates (1) to (9) in an input coordinate system illustrated in FIG. 3C.

Figure 3D:
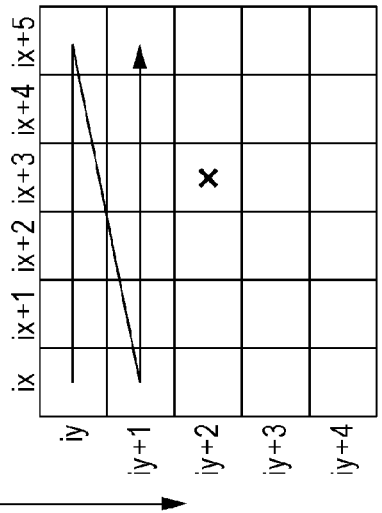

Because of the order of scanning of input pixels, a next input pixel is a pixel at coordinates (ix+3, iy+2) as illustrated in FIG. 3D. Therefore, when this input pixel is subjected to a coordinate transform, the results (4) to (9) of the inverse transforms performed on the coordinates in the input coordinate system illustrated in FIG. 3C overlap and are necessary. In addition, for example, when a coordinate transform is performed on coordinates (ix, iy+3) of an input pixel in a next line, the results (2) and (3) of the inverse transforms performed on the coordinates in the input coordinate system illustrated in FIG. 3C overlap and are necessary. Therefore, the result update section 111 combines the results (2) to (9) of the inverse transforms performed on the coordinates in the input coordinate system illustrated in FIG. 3C and the corresponding coordinates (2) to (9) adjacent to the output pixel in the output coordinate system illustrated in FIG. 3B with each other and outputs the combinations to the inverse transform result storage section 110 to hold the combinations.

FIG. 3D illustrates an input coordinate system at a next pixel input timing, and an X indicates coordinate (ix+3, iy+2) of a next input pixel. FIG. 3E illustrates an output coordinate system, and an X indicates coordinates (ox+3, oy+2), which are a result of a transform performed by the coordinate transform section 104. Nine sets of coordinates adjacent to an output pixel generated by the output pixel adjacent coordinate generation section 105 are coordinates (4) to (12) illustrated in FIG. 3E. Results output by the coordinate inverse transform section 106 after the nine sets of coordinates are input to the coordinate inverse transform section 106 are indicated by coordinates (4) to (12) in an input coordinate system illustrated in FIG. 3F.

Here, the inverse transform result storage section 110 holds results of the inverse transforms performed on the coordinates (4) to (9) in the output coordinate system. Therefore, when the coordinate inverse transform section 106 performs inverse transforms, no calculations need to be performed on the coordinates (4) to (9), and inverse transforms are performed only on the coordinates (10) to (12).

Thus, according to this embodiment, calculations are performed only for three sets of coordinates, not for nine sets of coordinates, as the inverse transforms. In addition, in processing of a next line, the results of the inverse transforms obtained in the current line can be used, and accordingly it is sufficient that calculations be performed only on two sets of coordinates as the inverse transforms.

If coordinates to be held are determined using a general expression, the following procedure is performed. First coordinates in an input coordinate system input in the order of scanning in one screen are (0, 0), and last coordinates are $(X_{max}, Y_{max})$. The coordinates of a current input pixel in the input coordinate system are (ix, iy), and coordinates in an input coordinate system obtained by performing inverse transforms on nine sets of coordinates adjacent to an output pixel are $(rix_1, riy_1)$ to $(rix_9$ to $riy_9)$. Here, $0 \leq ix \leq X_{max}$, $0 \leq iy \leq Y_{max}$, $0 \leq rix_1, rix_2, \ldots, rix_9 \leq X_{max}$, and $0 \leq riy_1, riy_2, \ldots, riy_9 \leq Y_{max}$.

In this case, the result update section 111 makes determinations in such a way as to hold, among the coordinates $(rix_1, riy_1)$ to $(rix_9, riy_9)$, coordinates that satisfy $rix_1, rix_2, \ldots, rix_9 \leq ix-1$ and $riy_1, riy_2, \ldots, riy_9 \leq iy-1$. As described above, by holding results of transforms that will later be subjected to coordinate transforms in consideration of the order of scanning of input pixels, the average number of coordinate transforms can be reduced.

In this embodiment, the output pixel adjacent coordinate generation section 105 generates nine sets of coordinates of adjacent pixels including the center of the coordinates of an output pixel output from the coordinate transform section 104. Here, the number of sets of coordinates generated varies depending on an enlargement/reduction ratio in geometric transformation. In addition, different determination methods may be used by the result update section 111 depending on the number of sets of coordinates generated and the capacity of the inverse transform result storage section 110. In addition, although a projective transform is taken as an example in this embodiment, the technique disclosed herein may be applied to geometric transformation other than the projective transform, insofar as a coordinate transform and an inverse transform are performed. According to the configuration of the image processing apparatus 101 according to the above embodiment, the number of calculations performed as coordinate transforms can be reduced in an inverse transform process for performing geometric transformation on an input image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-009778 filed Jan. 22, 2014, which is hereby incorporated by reference herein in its entirety.

What is claimed is:

1. An image processing apparatus that outputs a transformed image obtained by performing geometric transformation on an input image, the image processing apparatus comprising:
   an identification unit configured to identify, on the basis of inverse parameters of the geometric transformation, a plurality of second sets of coordinates in the input image corresponding to a plurality of first sets of coordinates in the transformed image located within a certain distance from a first set of coordinates;
   a control unit configured to specify, among a plurality of third sets of coordinates located within the certain distance from a second set of coordinates in the transformed image, one or more sets of coordinates that overlap the plurality of first sets of coordinates in the transformed image located within the certain distance from the first set of coordinates, and to determine, among the plurality of second sets of coordinates identified by the identification unit, one or more sets of coordinates in the input image corresponding to the specified one or more sets of coordinates, and to cause a memory to store the specified one or more sets of coordinates and the determined one or more sets of coordinates associated with each other; and
   a generation unit configured to generate the transformed image by determining pixel values corresponding to the first set of coordinates in the transformed image based on pixel values corresponding to the plurality of second sets of coordinates identified by the identification unit, and pixel values corresponding to the second set of coordinates in the transformed image based on pixel values corresponding to the sets of coordinates including the determined one or more sets of coordinates in the input image stored in the memory.

2. The image processing apparatus according to claim 1, wherein the plurality of first sets of coordinates in the transformed image are identified on the basis of sets of coordinates in the input image and parameters of the geometric transformation.

3. The image processing apparatus according to claim 1, wherein the identification unit identifies sets of coordinates in the input image corresponding to, among the plurality of third sets of coordinates in the transformed image, sets of coordinates that do not overlap the plurality of first sets of coordinates, and
wherein the generation unit determines the pixel values corresponding to the second set of coordinates using pixel values corresponding to the sets of coordinates in the input image identified by the identification unit and pixel values corresponding to the sets of coordinates stored by the control unit in the memory.

4. The image processing apparatus according to claim 3, wherein a number of sets of coordinates in the input image referred to by the generation unit to determine the pixel values corresponding to the plurality of first sets of coordinates is the same as a number of sets of coordinates in the input image referred to by the generation unit to determine the pixel values corresponding to the plurality of second sets of coordinates.

5. The image processing apparatus according to claim 1, wherein the generation unit determines a pixel value corresponding to a set of coordinates in the transformed image through an interpolation process for pixel values corresponding to a certain number of sets of coordinates in the input image.

6. A method for processing an image used for outputting a transformed image obtained by performing geometric transformation on an input image, the method comprising the steps of:
   identifying, on the basis of inverse parameters of the geometric transformation, a plurality of second sets of coordinates in the input image corresponding to a plurality of first sets of coordinates in the transformed image located within a certain distance from a first set of coordinates;
   specifying, among a plurality of third sets of coordinates located within the certain distance from a second set of coordinates in the transformed image, one or more sets of coordinates that overlap the plurality of first sets of coordinates in the transformed image located within the certain distance from the first set of coordinates, and determining, among the plurality of second sets of coordinates identified in the step of identifying, one or more sets of coordinates in the input image corresponding to the specified one or more sets of coordinates, and causing a memory to store the specified one or more sets of coordinates and the determined one or more sets of coordinates associated with each other; and
   generating the transformed image by determining pixel values corresponding to the first set of coordinates in the transformed image based on pixel values corresponding to the plurality of second sets of coordinates identified in the step of identifying, and pixel values corresponding to the second set of coordinates in the transformed image based on pixel values corresponding to the sets of coordinates including the determined one or more sets of coordinates in the input image stored in the memory.

7. The method according to claim 6, wherein, in the step of identifying, sets of coordinates in the input image corresponding to, among the plurality of third sets of coordinates in the transformed image, sets of coordinates that do not overlap the plurality of first sets of coordinates are identified, and
wherein, in the step of generating, the pixel values corresponding to the second set of coordinates are determined using pixel values corresponding to the sets of coordinates in the input image identified in the step of identifying and pixel values corresponding to the sets of coordinates stored in the memory.

8. The method according to claim 7, wherein a number of sets of coordinates in the input image referred to in the step of generating to determine the pixel values corresponding to the plurality of first sets of coordinates is the same as a number of sets of coordinates in the input image referred to in the step of generating to determine the pixel values corresponding to the plurality of second sets of coordinates.

9. A non-transitory computer-readable storage medium storing a program for causing a computer to execute a method for processing an image used for outputting a transformed image obtained by performing geometric transformation on an input image, the method comprising the steps of:
   identifying, on the basis of inverse parameters of the geometric transformation, a plurality of second sets of coordinates in the input image corresponding to a plurality of first sets of coordinates in the transformed image located within a certain distance from a first set of coordinates;
   specifying, among a plurality of third sets of coordinates located within the certain distance from a second set of coordinates in the transformed image, one or more sets of coordinates that overlap the plurality of first sets of coordinates in the transformed image located within the certain distance from the first set of coordinates, and determining, among the plurality of second sets of coordinates identified in the step of identifying, one or more sets of coordinates in the input image corresponding to the specified one or more sets of coordinates, and causing a memory to store the specified one or more sets of coordinates and the determined one or more sets of coordinates associated with each other; and
   generating the transformed image by determining pixel values corresponding to the first set of coordinates in the transformed image based on pixel values corresponding to the plurality of second sets of coordinates identified in the step of identifying, and pixel values corresponding to the second set of coordinates in the transformed image based on pixel values corresponding to the sets of coordinates including the determined one or more sets of coordinates in the input image stored in the memory.

10. The non-transitory storage medium according to claim 9, wherein, in the step of identifying, sets of coordinates in the input image corresponding to, among the plurality of third sets of coordinates in the transformed image, sets of coordinates that do not overlap the plurality of first sets of coordinates are identified, and
wherein, in the step of generating, the pixel values corresponding to the second set of coordinates are determined using pixel values corresponding to the sets of coordinates in the input image identified in the step of identifying and pixel values corresponding to the sets of coordinates stored in the memory.

11. The non-transitory storage medium according to claim 10,
  wherein a number of sets of coordinates in the input image referred to in the step of generating to determine the pixel values corresponding to the plurality of first sets of coordinates is the same as a number of sets of coordinates in the input image referred to in the step of generating to determine the pixel values corresponding to the plurality of second sets of coordinates.

* * * * *